United States Patent [19]
Batistoni

[11] Patent Number: 5,183,625
[45] Date of Patent: Feb. 2, 1993

[54] REMOVABLE PLATFORM FOR WORKING INSIDE A CASING OF A PRESSURIZER OF A PRESSURIZED-WATER NUCLEAR REACTOR

[75] Inventor: Michel Batistoni, Dracy le Fort, France

[73] Assignee: Famatome, Courbevoie, France

[21] Appl. No.: 679,228

[22] Filed: Apr. 2, 1991

[30] Foreign Application Priority Data

Apr. 2, 1990 [FR] France ............... 90 04190

[51] Int. Cl.⁵ .......................................... G21C 17/017
[52] U.S. Cl. .................................. 376/260; 376/249; 182/128
[58] Field of Search ...................... 376/249, 260, 307; 182/128; 414/146

[56] References Cited

U.S. PATENT DOCUMENTS

| | | | |
|---|---|---|---|
| 3,166,154 | 1/1965 | Titzel | 182/128 |
| 3,910,379 | 10/1975 | Miller et al. | 182/128 |
| 4,173,060 | 11/1979 | Massaro, Jr. et al. | 376/260 |
| 4,672,741 | 6/1987 | Zafred et al. | 376/249 |
| 4,801,422 | 1/1989 | Turner et al. | 376/260 |
| 4,842,807 | 6/1989 | Fero et al. | 376/254 |

FOREIGN PATENT DOCUMENTS

2395461 1/1979 France .
2444996 7/1980 France .

Primary Examiner—Daniel D. Wasil
Attorney, Agent, or Firm—Pollock, Vande Sande & Priddy

[57] ABSTRACT

A removable platform comprises a chute (14) having a handling and fastening assembly (18, 19, 14a) at one of its ends and a supporting part (14b) in the form of a portion of a cylinder open laterally and extending the tube (14a) substantially in its axial direction, a supporting shaft (16) mounted in articulated manner at the end of the chute, an assembly of supporting arms (15) mounted for pivoting movement about the axis (29) of the supporting shaft (16) and a plurality of plane elements (17) resting on the supporting arms (15) in the unfolded position, to form a work platform substantially over the entire cross-section of the casing (2). The removable platform is introduced into the casing (2) in the folded-up state; the arms (15) form an assembly (30) seated in the chute (14), and the axis (20') at the supporting shaft (16) is substantially perpendicular to the longitudinal direction of the chute (14). The supporting shaft (16) and the arms (15) are subsequently tilted in such a way that the axis (29) of the supporting shaft (16) coincides with the axis (20) of the casing (2). The arms (15) are subsequently unfolded by pivoting about the axis (29) of the supporting shaft (16), and the plane elements (17) are put in place on the supporting arms (15) in the unfolded position.

8 Claims, 3 Drawing Sheets

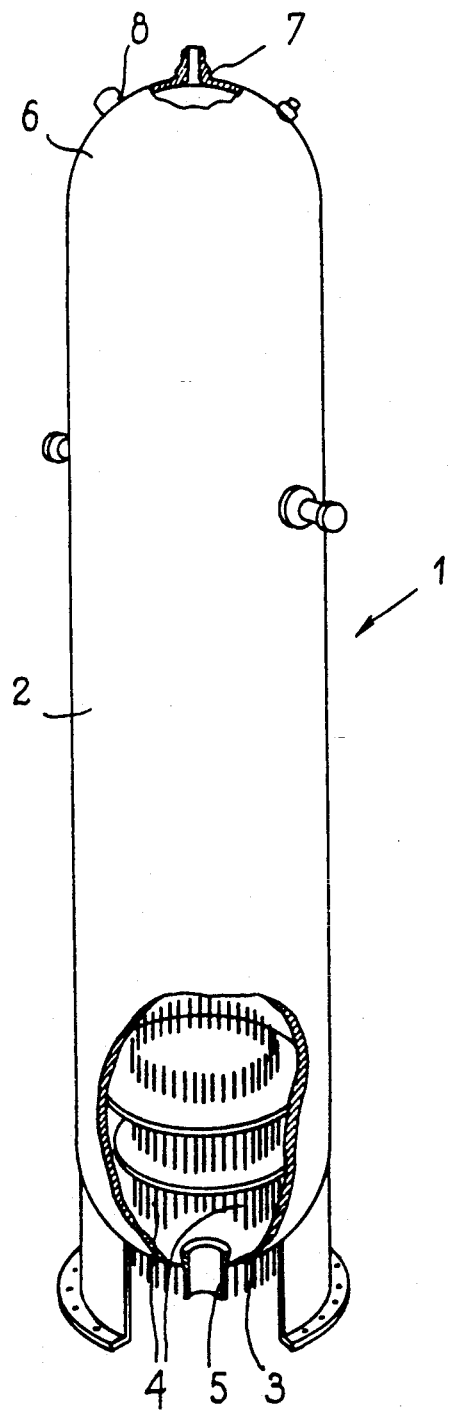
FIG_1

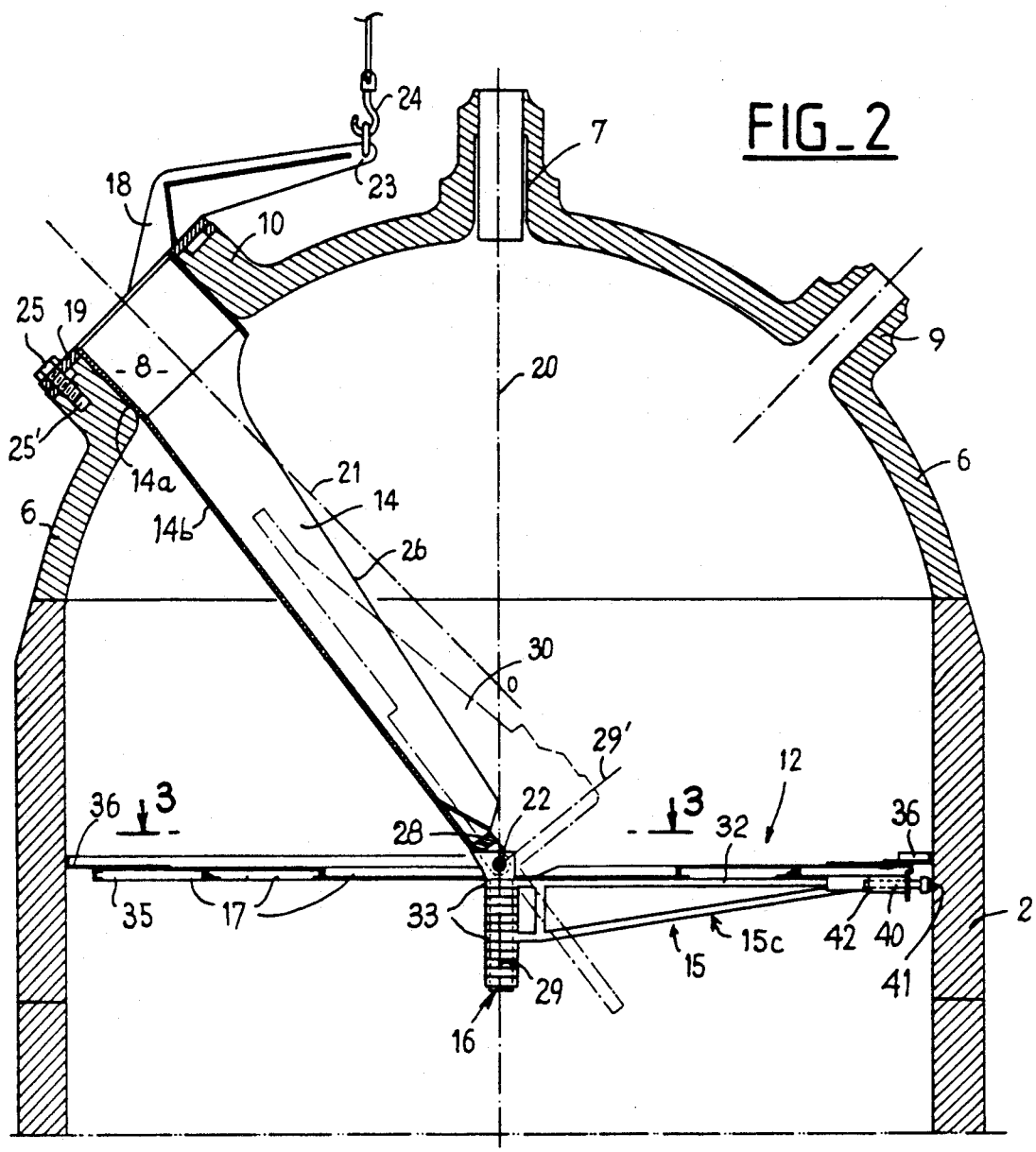
FIG_2
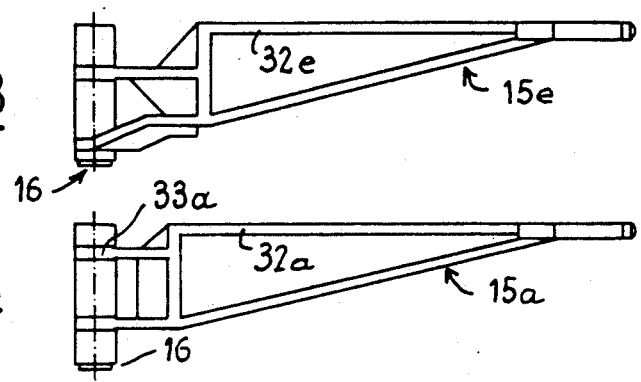
FIG_2B
FIG_2A

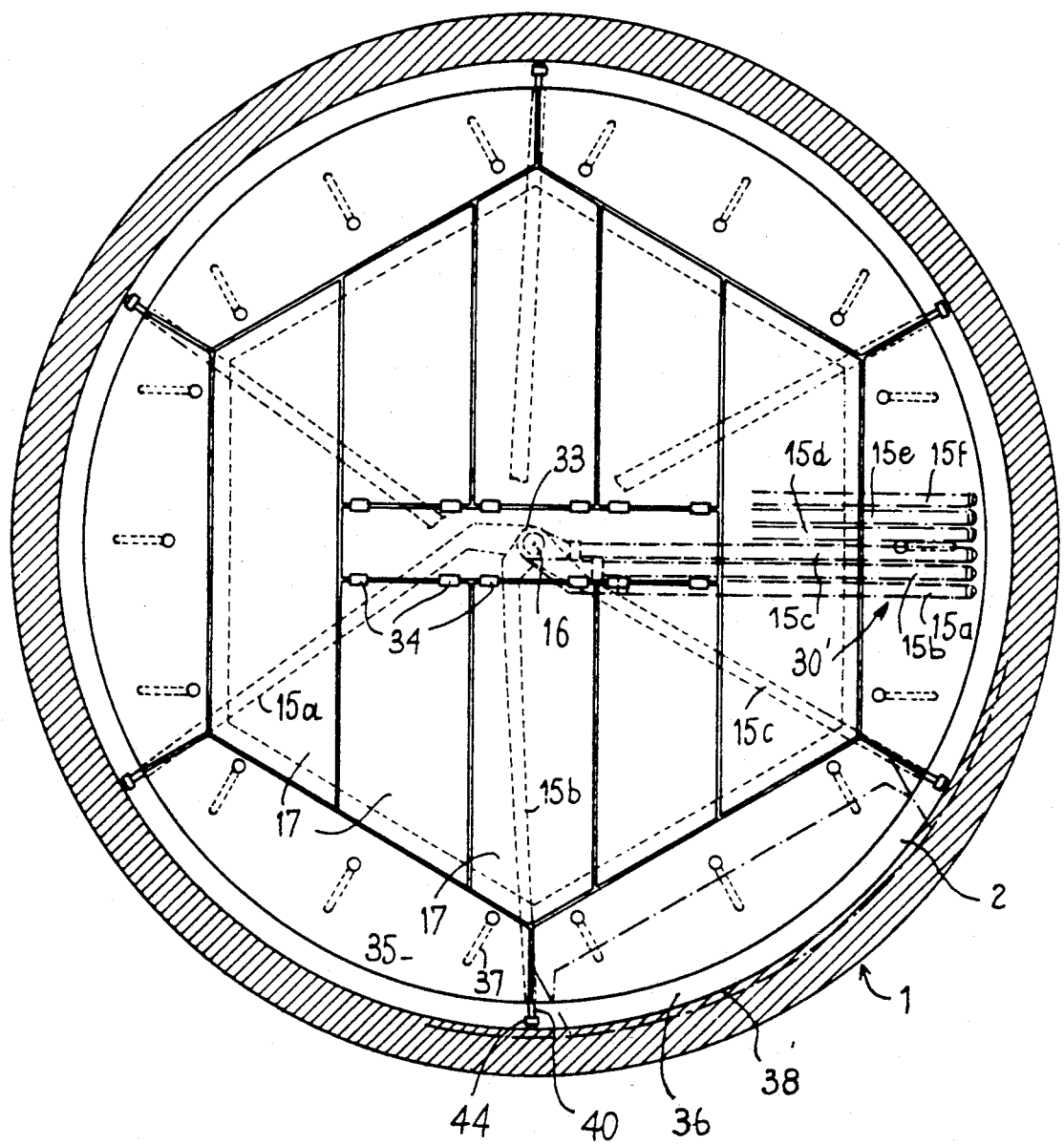
FIG_3

REMOVABLE PLATFORM FOR WORKING INSIDE A CASING OF A PRESSURIZER OF A PRESSURIZED-WATER NUCLEAR REACTOR

FIELD OF THE INVENTION

The invention relates to a removable platform for working inside a casing, such as the casing of a pressurizer of a pressurized-water nuclear reactor.

BACKGROUND OF THE INVENTION

Pressurized-water nuclear reactors comprise a primary circuit, in which the cooling water of the reactor is maintained at a high pressure of the order of 155 bars by means of a pressurizer arranged on one of the branches of the primary circuit.

The pressurizer makes it possible to keep the pressure in the primary circuit between predetermined limits, either by spraying when the pressure tends to exceed the permissible upper limit or by electrical heating of the primary fluid when the pressure tends to fall below the permissible lower limit. These operations are carried out inside the pressurizer which comprises a generally cylindrical casing, arranged with its axis vertical and having in its lower part closed and its upper part by means of domed bottoms.

The lower domed bottom has passing through it sleeves in which are introduced electrical heating pipes penetrating into the pressurizer.

The upper domed bottom has passing through it a connection piece for the spray piping of the pressurizer, connection pieces for instrumentation devices and at least one inspection port closeable by a sealing closure means.

The casing of the pressurizer of nuclear reactors being built at the present time has a diameter of the order of 2.40 m and a height of the order of 13 m.

During shutdowns of the nuclear reactor for the refuelling and maintenance of the reactor, various checking and repair operations are conducted on the pressurizer.

In particular, a check of the heating pipes and replacement of defective pipes penetrating into the pressurizer via its lower bottom are carried out. These operations can be conducted from outside the pressurizer by using at least partially automated devices.

The operators work in a zone adjacent to the outer wall of the casing of the pressurizer for a relatively short period of time. These operators are therefore subjected to low radiation doses.

In contrast, where work in the upper part of the pressurizer is concerned, for example for repairing or replacing various elements, such as the instrumentation connection pieces, it is necessary for the operators to enter the casing of the pressurizer, i.e., a zone which is highly activated because the primary fluid in the reactor comes in contact with the inner surface of the casing of the pressurizer during the operation of the reactor. Moreover, the maintenance or repair operations which have to be carried out in the upper part of the pressurizer make it necessary to install work platforms or floors inside the pressurizer because of the considerable height of the casing. These platforms or floors rest on the upper part of scaffolding which bears on the bottom and on the side wall of the pressurizer.

The scaffolding necessary for working in the upper part of the casing of the pressurizer have a height of approximately 10 m and consist of elementary parts which can be joined together, for example by snapping.

The mounting of such scaffolding of great height inside the casing of the pressurizer is an operation which is difficult and tricky to carry out and which requires a relatively long period of execution.

The operators who have to work in a highly contaminated zone where there is considerable radiation are liable to receive high radiation doses. In some cases, the radiation in particular parts of the pressurizer can be so great that it is impossible to consider carrying out an operation to mount a work platform.

Furthermore, insofar as the scaffolding consists of separate parts which can be snapped together, some of these parts can accidentally fall to the bottom of the pressurizer during the mounting operation and damage the end parts of the heating pipes projecting inside the casing of the pressurizer.

SUMMARY OF THE INVENTION

It is therefore an object of the invention to provide a removable platform for working inside a casing, such as the generally cylindrical casing of a pressurizer of a pressurized-water nuclear reactor, arranged with its axis vertical and closed at its upper end by a domed bottom through which passes at least one inspection port, the work platform being capable of being installed in the casing and dismounted and extracted by means of operations conducted from outside the casing, so as to avoid the presence of operators inside the casing for a prolonged period of time and prevent component elements of the platform from falling into the lower part of the casing during the mounting or dismounting of this removable platform.

To this end, the removable platform according to the invention comprises:

at one of its ends a handling and fastening assembly consisting of an element for catching on a lifting means, a cylindrical tube and a flange, for engaging it into the inspection orifice of the casing and fastening it by the screwing of the flange to an outer part of the casing, and a supporting part in the form of a portion of a cylinder open laterally and extending the tube in its axial direction, a supporting shaft mounted in an articulated manner at that end of the chute which is opposite the end having the handling and fastening assembly, this end being located in the vicinity of the axis of the casing when the chute is installed in the casing, the axis of articulation of the supporting shaft then being in a horizontal position, so that this shaft can pivot between a folded-up position substantially perpendicular to the longitudinal direction of the chute and an operating position in which the shaft is substantially coaxial with the casing, an assembly of supporting arms mounted on the supporting shaft pivotably between a folded-up position, in which the supporting arms are substantially parallel to and laid against one another, the arms then being capable of being placed and maintained in the chute in its axial direction, the supporting shaft being in its folded-up position, and an unfolded position, in which the arms, by pivoting about the axis of the supporting shaft in the vertical position, can be placed in angular arrangements distributed substantially uniformly about the axis of the casing, and a plurality of plane elements intended for resting on the supporting arms in the unfolded position, to form a work platform substantially over the entire cross-section of the casing.

BRIEF DESCRIPTION OF THE DRAWINGS

To make it easy to understand the invention, an embodiment of a removable platform according to the invention, used for carrying out work in the upper part of a pressurizer of a pressurized-water nuclear reactor, will now be described by way of example with reference to the accompanying drawings.

FIG. 1 is a cut-away perspective view of a pressurizer of a pressurized-water nuclear reactor.

FIG. 2 is a sectional view in a vertical plane through the upper part of the pressurizer shown in FIG. 1, in which a removable platform according to the invention has been installed.

FIG. 2A is a side elevation view of one of the supporting arms of the removable platform shown in FIG. 2.

FIG. 2B is a side elevation view of a supporting arm different from the arm shown in FIG. 2A, in its engagement position on the supporting shaft.

FIG. 3 is a top plan view, along line 3—3 of FIG. 2, of the removable platform installed inside the casing of the pressurizer.

DESCRIPTION OF PREFERRED EMBODIMENT

FIG. 1 shows a pressurizer 1 of a pressurized-water nuclear reactor, comprising a cylindrical casing 2 arranged with its axis vertical when the pressurizer is in operating position.

The casing 2, in the vicinity of its lower end, comprises a first domed bottom 3, through which pass a large number of sleeves, in each of which a heating pipe 4 is engaged.

The heating pipes are placed in a vertical arrangement in the lower part of the pressurizer casing 2, into which they project.

A connection piece 5 passing through the bottom 3 makes it possible to put the inner volume of the pressurizer in communication with the primary circuit of the reactor by means of a conduit of large cross-section. The upper part of casing 2 of the pressurizer is closed by a domed bottom 6, through the central part of which passes a connection piece 7, to which the spray piping of the pressurizer is connected.

Further connection pieces are provided on the upper domed bottom 6 for the passage of instrumentation devices into the casing of the pressurizer.

The domed bottom 6 likewise has passing through it an inspection port 8 or manhole which is sealingly closed during the operation of the pressurizer.

When the pressurizer is in a normal operating phase, the lower part of its casing which is located above the bottom 3 and in which the heating pipes 4 are arranged contains pressurized water. The upper part of the inner volume of the casing 2, into which opens the connection piece 7 for the spray piping, contains steam in pressure equilibrium with the water contained in the lower part of the casing.

FIG. 2 shows the upper part of the casing 2 of the pressurizer, closed by the domed bottom 6, through which pass the connection piece 7 for the spray piping and the manhole 8. The upper domed bottom 6 can have instrumentation connection pieces, such as the connection piece 9, passing through it.

The manhole 8 is made in the inner bore of a neck 10 formed in the wall of the domed bottom 6.

The plug for the sealing closure of the manhole 8 is fastened to the outer end of the neck 10, to ensure the sealing closure of the pressurizer during its operation.

The neck 10 and the manhole are also used for carrying out the installation and fastening of the removable platform according to the invention during the shutdown periods of the nuclear reactor, the pressurizer having previously been drained and cooled.

The removable platform 12 according to the invention, consists of a chute 14 allowing the handling and fastening of the platform for installing it in the casing of the pressurizer, a supporting shaft 16 mounted in an articulated manner at one of the ends of the chute 14, an assembly of supporting arms, such as arm 15, mounted pivotably on the shaft 16, and a plurality of plane elements 17 intended for forming a work platform over substantially the entire cross-section of the cylindrical casing 2 of the pressurizer.

The chute 14, at one of its ends, has a handling and fastening assembly comprising the end part 14a of the chute having the form of a cylindrical tube, a flange 19 fixed to the tube 14a at its end, and a bent catch element 18 of bent form fastened to the flange 19.

The chute has a supporting part 14b fastened to the end of the tube 14a opposite the flange 19 and in the extension of this tube.

When the chute 14 is introduced into the manhole 8, as shown in FIG. 2, the tube 14a, the diameter of which is very slightly smaller than the diameter of the bore of the neck 10 forming the manhole 8, assumes a position coaxial relative to the manhole.

The axis 21 of the manhole is directed along a radius of the spherical domed bottom and intersects the vertical axis of symmetry 20 of the casing of the pressurizer at a point O which forms a geometrical center of the spherical domed bottom.

The supporting part 14b of the chute forms a particular angle with the axis 21 of the manhole and of the tube 14a, and that end of it which is located opposite its handling and fastening part and on which the supporting shaft 16 is articulated is located in the vicinity of the axis 20 of the casing of the pressurizer, below the centre O of the domed bottom, when the chute is installed in the pressurizer, as shown in FIG. 2.

The horizontal axis of articulation 22 of the supporting shaft 16 on the end of the chute 14 coincides with the axis 20 of the casing of the pressurizer.

The catch element 18 of the chute is produced in bent and ribbed form and, at its end opposite the flange 19 to which it is fastened, has a catching orifice 23, in which can be engaged the hook 24 of a handling and lifting means for the installation of the chute 14 and of the structure of the support platform inside the casing of the pressurizer.

The means for handling and lifting the removal platform can consist, for example, of the polar bridge of the nuclear reactor or of an auxiliary hoist installed in the cave of the pressurizer.

The flange 19 has orifices which are brought into coincidence with the internally threaded holes, such as the hole 25', machined in the neck 10 delimiting the manhole 8.

The fastening screws, such as the screw 25, are engaged in the orifices of the flange 9 and in the corresponding internally threaded holes 25', to ensure that the flange 19 is clamped against the outer end of the neck 10.

The flange 19 and the neck 10 generally have three orifices arranged at 120° relative to one another about the axis 21 common to the neck 10 and to the tube 14a.

The supporting part 14b of the chute 14 consists of a portion of a cylinder having a longitudinally directed lateral orifice delimited by edges formed by a cutout 26 inclined slightly relative to the longitudinal direction of the chute.

The part 14b of the chute, at its end opposite the installing and fastening tube 14a, carries a bearing 28, in which the pivot axle 22 of the supporting shaft 16 is mounted rotatably.

As mentioned above, the position of the bearing 28 at the end of the chute 14 is such that, when the chute 14 is in place in the pressurizer, the axis of articulation 22 coincides with the axis of symmetry 20 of the casing of the pressurizer.

The supporting shaft 16 is mounted pivotably by means of the axle 22 in the bearing 28 fixed to the chute 14, so as to be displaceable between the operating position of the removable platform, shown in FIG. 2, in which the axis 29 of the supporting shaft 16 coincides with the axis 20 of the casing, and a folded-up position in which the axis 29 of the supporting shaft 16 is in a position 29' substantially perpendicular to the longitudinal direction of the chute 14.

The supporting shaft 16 carries an assembly of supporting arms 15 which are mounted on the shaft 16 for pivoting movement about the geometrical axis 29.

As will be described in more detail hereinbelow, each of the supporting arms 15 is movable between a folded-up position and an unfolded position allowing a work platform to be installed in a cross-section of the casing of the pressurizer.

FIG. 3 shows the supporting arms 15 in their folded-up position in dot-and-dash lines.

The removable platform comprises a supporting structure consisting of six arms 15a, 15b, 15c, 15d, 15e, 15f mounted pivotably on the supporting shaft 16.

In their folded-up position, the arms 15a to 15f are substantially parallel to and laid against one another, to form a compact assembly which can be moved as a whole between a transport and handling position 30, represented by dot-and-dash lines in FIG. 2, the axis of the supporting shaft 16 then being in its position 29', and an operating position 30', shown in FIG. 3, the axis 29 of the supporting shaft 16 then coinciding with the axis 20 of the casing of the pressurizer, and the arms 15a to 15f being substantially horizontal.

The displacement of the assembly of supporting arms 15 between their handling and transport position and their operating position is carried out by means of a pull-and-push device, such as a ball cable of the Teleflex type, connected to suitable gearing mounted on the supporting shaft 16, or by means of an actuating pole which can be connected to the assembly of arms 15.

As can be seen in FIGS. 2, 2A, 2B and 3, the arms 15 consist of generally triangular braced structures having a substantially horizontal upper bearing bar 32, on which the plane elements 17 forming the work platform come to rest.

Each of the arms comprises two bearings 33 allowing it to be mounted on the supporting shaft 16 in an articulated and stable manner.

The arms 15 are all different with regard to their form and the height of the bearings 33 allowing them to be mounted pivotably on the supporting shaft 16.

As can be seen in FIG. 3, the connecting part between the bearings 33 and the straight part of the supporting arm comprising the bearing bar 32 has a bent form, while the connecting parts of the various arms 15 have different forms. Thus, the six arms 15a, 15b, to 15f can be mounted pivotably on the supporting shaft 16, in such a way that their bearings 33 are placed in successive adjacent positions in the axial direction 29 of the supporting shaft 16.

When the arms 15 are mounted on the supporting shaft 16, their bearing bars 32 are all at the same level, even though the supporting arms are articulated on the supporting shaft 16 at different heights. This result is obtained because of the different forms of the arms 15, as can be seen in FIGS. 2, 2A and 2B.

FIG. 2 shows particularly the form of the supporting arm 15c, the bearings of which are arranged on the supporting shaft 16 at the highest level.

FIG. 2A shows the arm 15a, the bearings of which are located at the second level below the arm 15c. Finally, FIG. 2B shows the arm 15e, the bearings 33e of which are located at the fourth level below the bearings 33c of the highest arm 15c.

As can be seen in FIG. 3, the bent connecting parts between the bearings 33 and the straight parts of the arms 15 take their place above one another in the folded-up position of the arms, so that the straight parts of the arms and particularly the bearing bars 32 are in an arrangement parallel to and laid against one another.

FIG. 3 also shows the arms 15 in unfolded position underneath the work platform consisting of the plane elements 17, their straight part being arranged in radial directions relative to a cross-section of the casing 2 of the pressurizer 1, forming angles of 60° with one another.

This unfolded arrangement of the arms 15 is obtained from the operating position of these arms shown in dot-and-dash lines in FIG. 3, the axis 29 of the supporting shaft 16 being vertical and coinciding with the axis 20 of the pressurizer.

This position is obtained by rotating each of the arms 15 through a desired angle about the axis 29 of the supporting arm 16. The unfolded position of the arm 15c is obtained by a rotation of approximately 30°, the unfolded position of the arm 15b by a rotation of approximately 90° and the position of the arm 15c by a rotation of approximately 120°.

The unfolded positions of the arms 15d, 15e and 15f are obtained by rotations of these arms of approximately 30°, 90° and 120° in a pivoting direction opposite to the pivoting direction of the arms 15a, 15b and 15c.

When the arms 15 are in their unfolded position, the supporting structure formed by these arms is ready to receive the work platform consisting of plane elements 17 placed next to one another and connected by means of connecting elements 34.

Putting the arms 15 into the unfolded position can be controlled remotely from outside the casing of the pressurizer, for example by using a control of the Teleflex type or by using an actuating pole.

The plane elements 17 forming the work platform can subsequently be placed and assembled together on the bearing bars 32 of the arm 15 by an operator working inside the casing of the pressurizer.

The platform can also consist of a lightweight structure introduced in the folded-up state into the casing of the pressurizer and, after being introduced into the casing, actuated so as to be put into a swungopen or unfolded state, in which this structure covers the bearing bars 32 of the arms 15, so as to occupy a substantial part or all of the cross-section of the casing 2 of the pressurizer 1.

This actuation of a lightweight structure in order to unfold it inside the casing of the pressurizer can be controlled remotely from outside the pressurizer or be carried out by an operator working inside the pressurizer.

As regards a work platform consisting of elements 17 placed next to one another and assembled together, the elements located in the central part of the platform are generally of trapezoidal form and have outer parts connected to complementary elements 35 in the form of sectors of a circle, of which the outer edge in the form of a portion of a circle is intended to come into contact with or into the vicinity of the inner surface of the cylindrical casing 2 of the pressurizer 1.

On these outer elements 35 can be mounted adjustable elements 36 in the form of sectors of a circle, which are connected to the elements 35 by means of studs engaged into radially directed slots 37 made in the elements 35.

FIG. 3 shows an element 36 the radial displacement of which relative to the corresponding element 35 makes it possible to adjust the position of the outer edge 38 of circular form, in such a way that this edge comes in contact with the inner surface of a pressurizer casing 2.

The elements 36 make it possible to produce a platform which is continuous in its peripheral part coming in contact with the inner surface of the casing of the pressurizer.

The platform obtained thus occupies the entire cross-section of the casing 2 and makes it possible to prevent any article or tool from falling into the lower part of the pressurizer during the work being carried out by the use of the work platform.

Furthermore, the arms 15, in their outer end part opposite their pivot bearing 33, have a rod 40 mounted slidably in the structure of the arm and pierced with orifices capable of coinciding with the orifices with the corresponding arm 15 for the engagement of pins 42 allowing the radial extension of the arm produced in telescopic form to be fixed on. The end of the rod 40 is integral with a head 41 coming in contact with the inner wall of the pressurizer casing 2 when the arms are put into operation in their unfolded position.

The telescopic mounting of the end of the arm and the radially adjustable elements 36 make it possible to match the work platform to the inside diameter of the pressurizer casing within an adjustment range of some extent.

The installation of the removable platform according to the invention inside the casing of a pressurizer can therefore be carried out completely or largely by means of operations conducted from outside the casing of the pressurizer.

In a first step, the chute 14, in which the assembly of arms 15 is arranged in its folded-up position 30, is brought by a handling and lifting means into a position allowing it to be introduced into a manhole 8 passing through the upper domed bottom of the pressurizer.

The catch element 18 is designed in such a way that the inclination of the chute in the free state at the end of the hook of the lifting means corresponds substantially to the inclination of the axis 21 of the manhole.

The chute is introduced into the pressurizer casing by the handling and lifting means, in such a way that the tube 14a engages into the manhole and the flange 19 comes to bear on the outer part of the neck 10.

The flange 19 is then fastened to the neck 10 by screwing, and thereafter the arms 15 are put into operating position by tilting the supporting shaft 16 in such a way that its axis 29 assumes a vertical position coinciding with the axis of the pressurizer casing.

The arms 15 are then placed in their unfolded position at 60° relative to one another.

Finally, the work platform is placed on or unfolded onto the bearing bars 32 of the supporting arms 15, in their operating position.

All these operations can be carried out very quickly and with the reduced involvement or even without the involvement of an operator inside the casing of the pressurizer.

When the structure is in place, the adjustment of the peripheral plane elements of the work platform makes it possible to obtain a continuous platform having no discontinuity or orifices, through which articles, such as tools, could fall into the lower part of the pressurizer during the work being carried out by the use of the removable platform according to the invention.

Moreover, during the assembly itself, there are virtually no risks that component elements of the removable platform will fall into the pressurizer, since the elements forming the supporting structure of this platform are preassembled.

The device has a high rigidity, and as regards a pressurizer of a nuclear reactor of the current type it has been possible to produce this platform so that it supports loads greater than 400 kg.

The installation and use of a removable platform according to the invention thus makes it possible to reduce to a minimum the doses of ionizing radiation received by the operators who have to assemble the platform and work in the pressurizer.

The supporting arms can have a structure other than that described, and can be mounted on the supporting shaft by the use of means of articulation other than those described.

The chute can have a form different from that described, so long as it has sufficient rigidity to support the removable platform and the loads coming to rest on this platform during the work carried out inside the pressurizer.

It is also clear that the work platform can be produced in a manner different from that described either from attached plane elements or from a lightweight structure which can be swung out, unfolded or unwound inside the pressurizer.

The control means ensuring that the supporting arms are put into the operating position can be of any type, these means preferably being remote-controlled.

It is possible to have supporting structures comprising a number of arms other than six, in the operating position these arms being placed in angular positions which can be distributed uniformly about the axis of the casing.

Finally, the removable work platform according to the invention can be used for carrying out work not only inside the casing of a pressurizer of a pressurized-water nuclear reactor and in its upper part, but also inside a vertical cylindrical casing used in any part of a nuclear reactor, or even inside vertical cylindrical casings used in any industry, such as the chemical industry, petroleum industry or metallurgy.

I claim:

1. Removable platform for working inside a casing of a generally cylindrical pressurizer of a pressurized-water nuclear reactor, arranged with its axis vertical and closed at its upper end by a domed bottom through which passes at least one inspection port, said platform being adapted to being installed in said casing and dismounted and extracted by means of operations conducted from outside said casing, said platform comprising (a) a chute having a handling and fastening assembly at a first end of said chute, consisting of an element for catching on a lifting means, a cylindrical tube and a flange for engaging it into an inspection orifice of said casing and fastening it by screwing of said flange to an outer part of said casing, and a supporting part in a form of a portion of a cylinder open laterally and extending said tube substantially in an axial direction of said tube;

(b) a supporting shaft mounted in an articulated manner at a second end of said chute opposite said first end, said second end being located in the vicinity of an axis of said casing when said chute is installed in said casing, an axis of articulation of said supporting shaft then being in a horizontal position, so that said supporting shaft can pivot between a folded-up position substantially perpendicular to a longitudinal direction of said chute and an operating position in which said support shaft is substantially coaxial relative to said casing;

(c) an assembly of supporting arms mounted on said supporting shaft for pivoting movement between a folded-up position in which said supporting arms are substantially parallel to and laid against one another, said supporting arms then being capable of being placed and maintained in said chute in its axial direction, said supporting shaft being in its folded-up position, and an unfolded position in which said arms (15), by pivoting about said axis of said supporting shaft in vertical position, can be placed in angular arrangements distributed substantially uniformly about said axis (20) of said casing (2); and (d) a plurality of plane elements intended for resting on said supporting arms in unfolded position, to form a work platform over substantially an entire cross-section of said casing (2).

2. Removable platform according to claim 1, wherein said arms have a braced structure comprising an upper bearing bar on which plane elements of said platform come to rest, and at least one pivot bearing connected to the reticular structure by means of a bent connecting element, each of said arms of said assembly of arms having a form different from that of the other arms as regards a position of said pivot bearing in said axial direction of said supporting shaft in relation to said bearing bar, so that said arms can be mounted in an articulated manner on said supporting shaft, with their pivot bearings in superposed position in an axial direction of said supporting shaft, said bearing bars having coplanar bearing surfaces, so that said bearing surfaces are in the same horizontal cross-sectional plane of said casing when said arms are in unfolded position.

3. Removable platform according to claim 2, wherein each of said arms comprises two pivot bearings in positions superposed in a direction of said axis of said supporting shaft.

4. Removable platform according to any one of claims 1 to 3, wherein each of said arms has a telescopic end to enable adjustment of a length of said arm as a function of an inside diameter of said casing.

5. Removable platform according to any one of claims 1 to 3, wherein said plane elements comprise central elements of trapezoidal form and peripheral elements in the form of sectors of a circle, of which the outer edge in the form of an arc of a circle is intended for coming in contact with or into the vicinity of an inner surface of said casing.

6. Removable platform according to claim 5, wherein said peripheral elements carry elements in the form of sectors of a circle having a position adjustable in radial directions of said casing, so as to match a dimension of said removable platform to a cross-sectional dimension of said casing and avoid the presence of orifices or gaps on the periphery of said platform between an outer edge of said platform and said inner wall of said casing.

7. Removable platform according to any one of claims 1 to 3, comprising six supporting arms which, in the unfolded position, are placed in angular arrangements at 60° relative to one another about an axis of said casing.

8. Removable platform according to claim 1, wherein said plane elements form a preassembled assembly which can be introduced in a folded-up state into said casing and swung out or unfolded inside said casing, on a supporting structure consisting of said arms in unfolded position.

* * * * *